US006860151B2

(12) United States Patent
Platt et al.

(10) Patent No.: US 6,860,151 B2
(45) Date of Patent: Mar. 1, 2005

(54) METHODS AND SYSTEMS FOR CONTROLLING MOVEMENT WITHIN MEMS STRUCTURES

(75) Inventors: William P. Platt, Columbia Heights, MN (US); Burgess R. Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/360,318

(22) Filed: Feb. 7, 2003

(65) Prior Publication Data

US 2004/0154397 A1 Aug. 12, 2004

(51) Int. Cl.[7] .................................................. G01P 9/04
(52) U.S. Cl. ................................. 73/504.16; 73/504.12
(58) Field of Search ........................ 73/504.16, 504.04, 73/504.12, 514.36

(56) References Cited

U.S. PATENT DOCUMENTS

| | | | |
|---|---|---|---|
| 5,349,855 A | 9/1994 | Bernstein et al. | |
| 5,392,650 A | 2/1995 | O'Brien et al. | |
| 5,458,000 A | 10/1995 | Burns et al. | |
| 5,496,436 A | 3/1996 | Bernstein et al. | |
| 5,581,035 A | 12/1996 | Greiff | |
| 5,646,348 A | 7/1997 | Greiff et al. | |
| 5,728,936 A | 3/1998 | Lutz | |
| 5,780,739 A * | 7/1998 | Kang et al. | ............... 73/504.16 |
| 5,892,153 A | 4/1999 | Weinberg et al. | |
| 5,952,574 A | 9/1999 | Weinberg et al. | |
| 6,040,625 A | 3/2000 | Ip | |
| 6,230,566 B1 | 5/2001 | Lee et al. | |
| 6,250,156 B1 * | 6/2001 | Seshia et al. | ............. 73/504.12 |
| 6,257,059 B1 | 7/2001 | Weinberg et al. | |
| 6,282,955 B1 * | 9/2001 | Hulsing, II | ............... 73/504.12 |
| 6,311,556 B1 | 11/2001 | Lefort et al. | |
| 6,350,983 B1 | 2/2002 | Kaldor et al. | |
| 6,426,538 B1 | 7/2002 | Knowles | |
| 6,481,285 B1 | 11/2002 | Shkel | |
| 2001/0042404 A1 | 11/2001 | Yazdi et al. | |
| 2002/0066317 A1 | 6/2002 | Lin | |
| 2002/0093067 A1 | 7/2002 | Knowles et al. | |
| 2002/0167248 A1 | 11/2002 | Chua et al. | |
| 2002/0178817 A1 | 12/2002 | Selvakumar et al. | |
| 2002/0184949 A1 | 12/2002 | Gianchandani et al. | |

FOREIGN PATENT DOCUMENTS

| | | |
|---|---|---|
| WO | WO 95/34798 | 12/1995 |
| WO | WO 01/22094 A2 | 3/2001 |

OTHER PUBLICATIONS

International Search Report dated Aug. 2, 2004, Application No. PCT/US2004/003734, 8 pages.

* cited by examiner

*Primary Examiner*—John E. Chapman
(74) *Attorney, Agent, or Firm*—Matthew Luxton, Esq.; Armstrong Teasdale LLP (57) ABSTRACT

A method for reducing undesired movements of proof masses in micro-electromechanical systems (MEMS) devices is described where the proof masses are suspended above a substrate by one or more suspensions. The method includes providing an anchor on the substrate substantially between a first proof and suspensions for the first proof mass and a second proof mass and suspensions for the second proof mass, coupling a first portion of a beam to the first proof mass, coupling a second portion of the beam to the second proof mass, and attaching a third portion of the beam to the anchor, the third portion extending between the first portion and second portion of the beam, the anchor and the third portion configured to allow for rotation about an axis perpendicular to the substrate.

35 Claims, 4 Drawing Sheets

METHODS AND SYSTEMS FOR CONTROLLING MOVEMENT WITHIN MEMS STRUCTURES

BACKGROUND OF THE INVENTION

This invention relates generally to micro-electromechanical systems (MEMS), and more specifically, to suppression of unwanted frequencies generated during operation of MEMS devices.

Micro-electromechanical systems (MEMS) integrate electrical and mechanical components on the same substrate, for example, a silicon substrate, using microfabrication technologies. The electrical components are fabricated using integrated circuit processes, while the mechanical components are fabricated using micromachining processes that are compatible with the integrated circuit processes. This combination makes it possible to fabricate an entire system on a chip using standard manufacturing processes.

One common application of MEMS devices is in the design and manufacture of sensor devices. The mechanical portion of the sensor device provides the sensing capability, while the electrical portion of the sensor device processes the information received from the mechanical portion. One example of a MEMS device is a gyroscope. Some inertial measurement units (IMUs) incorporate one or more MEMS gyroscopes.

One known type of MEMS gyroscope uses vibrating elements to sense angular rate through the detection of a Coriolis acceleration. The vibrating elements are put into oscillatory motion in a drive axis, which is parallel to the substrate. This desired oscillatory motion is sometimes referred to as differential mode oscillation. Once the vibrating elements are put in motion, the gyroscope is capable of detecting angular rates induced by the substrate being rotated about an input plane, which is perpendicular to the substrate. Coriolis acceleration occurs in a sense axis, which is perpendicular to both the drive axis and the input plane. The Coriolis acceleration produces a Coriolis motion having an amplitude proportional to the angular rate of the substrate. However, the vibrating elements sometimes exhibit other oscillatory movements outside of the above described and desired motion. These other oscillations are undesired and typically occur at frequencies that are different than the desired oscillations. One of these undesired oscillations is sometimes referred to as common mode oscillation, and colloquially referred to as "hula" mode oscillation.

BRIEF SUMMARY OF THE INVENTION

In one aspect, a method for reducing undesired movements of proof masses in micro-electromechanical systems (MEMS) devices is provided. The proof masses are suspended above a substrate by one or more suspensions. The method comprises providing an anchor on the substrate substantially between a first proof mass and suspensions for the first proof mass and a second proof mass and suspensions for the second proof mass. The method further comprises coupling a first portion of a beam to the first proof mass, coupling a second portion of the beam to the second proof mass, and attaching a third portion of the beam to the anchor, the third portion extending between the first portion and second portion of the beam, the anchor and the third portion configured to allow at least a partial rotation of the third portion of the beam about an axis perpendicular to the substrate.

In another aspect, a micro-electromechanical systems (MEMS) device is provided. The device comprises a substrate, at least one proof mass, at least two suspensions extending from each proof mass, and at least one anchor contacting the substrate. The device also comprises at least one beam comprising a first portion, a second portion, and a third portion. The first portion is coupled to the first proof mass, and the second portion is coupled to the second proof mass. The third portion extends between the first and second portions, and is connected to the anchor, the anchor and the third portion configured to allow at least a partial rotation of the third portion of the beam about an axis perpendicular to the substrate.

In still another aspect, an anchored support structure for a micro-electromechanical systems (MEMS) device is provided. The structure comprises an anchor connected to a substrate and a beam attached to the anchor. The beam comprises first portion, a second portion, and a third portion. The first portion is configured to be coupled to a first proof mass, and the second portion is configured to be coupled to a second proof mass. The third portion extends between the first portion and second portion, and the third portion is connected to the anchor, the anchor and the third portion configured to allow at least a partial rotation of the third portion of the beam about an axis perpendicular to the substrate.

In yet another aspect, a micro-electromechanical systems (MEMS) gyroscope is provided. The MEMS gyroscope comprises a substrate, two proof masses, and a plurality of suspensions, a first plurality configured to suspend the first proof mass above the substrate, and a second plurality configured to suspend the second proof mass above the substrate. The device also comprises an anchored support structure comprising an anchor formed on the substrate and a beam. The beam comprises a first portion coupled to the first proof mass, a second portion coupled to the second proof mass, and a third portion attached to the anchor. The third portion extends between the first and second portions. The anchor and the third portion are configured to allow at least a partial rotation of the third portion of the beam about an axis perpendicular to the substrate.

In another aspect, a method for correlating movement between respective proof masses in micro-electromechanical systems devices is provided. The proof masses are suspended above a substrate by one or more suspensions. The method comprises mechanically connecting the first proof mass and the second proof mass and providing a rotational moment within the mechanical connection.

DETAILED DESCRIPTION OF THE INVENTION

Figure 1:
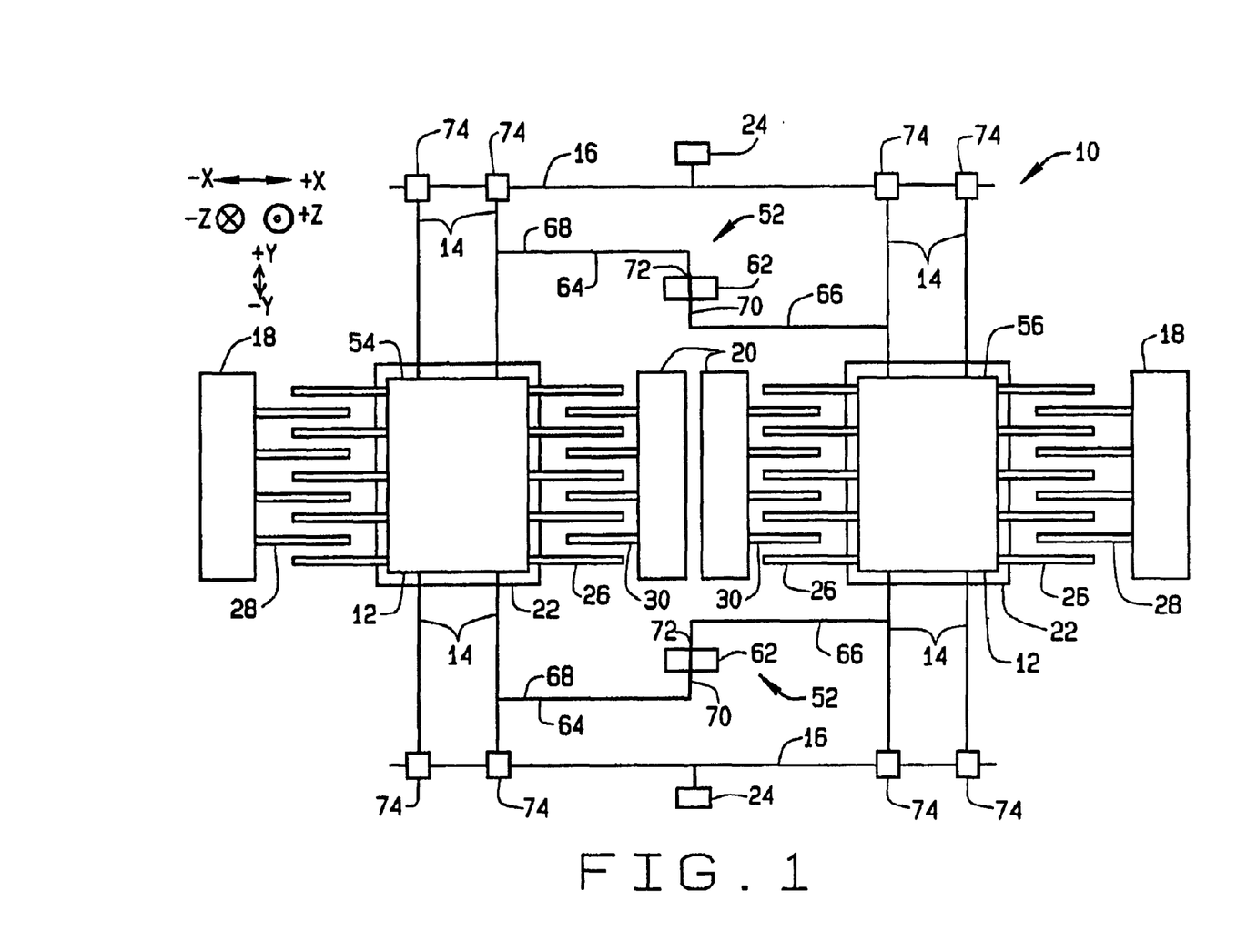
FIG. 1 is an illustration of a micro-electromechanical system (MEMS) having an anchored support structure between two proof mass support beams in accordance with one embodiment of the present invention.

FIG. 1 illustrates a plan view of a micro-electromechanical system (MEMS) gyroscope 10. MEMS gyroscope 10 is formed on a substrate (not shown) and includes at least one proof mass 12, a plurality of suspensions 14 for supporting proof masses 12, and at least one cross beam 16 connected to suspensions 14. In an alternative configuration, suspensions 14 are individually and directly connected to the substrate. MEMS gyroscope 10 also includes motor drive combs 18, motor pickoff combs 20, and sense plates 22, which correspond to individual proof masses 12. Gyroscope 10 also includes anchors 24 mounted on the substrate for support of cross beams 16.

Proof masses 12 are fabricated from any mass suitable for use in a MEMS gyroscope system. In one embodiment, proof mass 12 is a plate of silicon. Other materials compatible with micro-machining techniques may also be utilized. While FIG. 1 shows two proof masses 12, MEMS devices utilizing fewer or greater than two proof masses may also be utilized.

Proof masses 12 are located substantially between motor drive comb 18 and motor pickoff comb 20. Proof masses 12 include a plurality of comb-like electrodes 26. A portion of electrodes 26 extends towards motor drive comb 18 and a portion of electrodes 26 extends towards motor pickoff comb 20. While, in the illustrated embodiment, proof masses 12 have ten electrodes 26, it is known to utilize proof masses incorporating different numbers of electrodes.

Proof masses 12, in the embodiment shown, are supported above a respective sense plate 22 by suspensions 14. While four suspensions 14 are depicted in the Figure for suspending each proof mass 12, any number of suspensions 14 may be utilized. Suspensions 14 are, in one embodiment, beams micro-machined from a silicon wafer. Suspensions 14 also act as springs allowing proof masses 12 to move within a drive axis (X-axis) and a sense axis perpendicular to the substrate (Z-axis), as shown in FIG. 1. While shown in the Figures as being straight, suspensions 14 which utilize other configurations are known, and are contemplated to be applicable to the embodiments described within. One example of such a suspension, a folded beam suspension, is described below with respect to FIG. 5.

The plurality of suspensions 14 are connected to at least one cross beam 16. Cross beams 16 may be connected to at least one anchor 24 providing support for proof masses 12 of MEMS gyroscope 10. Anchors 24, in one embodiment, are connected to an underlying substrate (not shown). In another embodiment, anchors 24 are formed as part of the substrate. While two anchors 24 are depicted in FIG. 1, any number of anchors 24 can be utilized. Anchors 24 are positioned along a respective cross beam 16 in any manner that provides support to MEMS gyroscope 10. As described above, in an alternative configuration, suspensions 14 may be directly anchored to the substrate, thereby negating a need for cross beams 16 and anchors 24.

Motor drive combs 18 include a plurality of comb-like electrodes 28 extending towards a respective proof mass 12. While motor drive combs 18 are shown as having four electrodes 28, the number of electrodes 28 on motor drive combs 18 typically is determined by the number of electrodes 26 on the respective proof mass 12. Motor drive combs are typically connected to drive electronics (not shown in FIG. 1). Electrodes 26 and electrodes 28 are interdigitated as they extend from respective proof masses 12 and motor drive combs 18 and form capacitors. The capacitors allow MEMS gyroscope 10 to sense motion in the drive axis (X-axis).

Motor pickoff combs 20 also include a plurality of comb-like electrodes 30 extending towards a respective proof mass 12. While motor pickoff combs 20 are depicted as having four electrodes 30, the number of electrodes 30 extending from motor pickoff combs 20 is typically determined by the number of electrodes 26 on a respective proof mass 12. Motor pickoff combs 20 are sometimes referred to as sense combs. Electrodes 26 and electrodes 30 are interdigitated as they extend from respective proof masses 12 and motor pickoff combs 20 and form capacitors. The capacitors allow MEMS gyroscope 10 to sense motion in the drive axis (X-axis).

Sense plates 22 are parallel with their respective proof mass 12 and form a capacitor. If an angular rate (i.e. an aircraft turning) is applied to MEMS gyroscope 10 along an input axis (Y-axis) while the at least one proof mass 12 is oscillating along the drive axis (X-axis), a Coriolis force is detected in the sense axis (Z-axis). The capacitance is used to sense motion in the sense axis (Z-axis). An output of MEMS gyroscope 10 typically is a signal proportional to the change in capacitance caused by the motion. Sense plates 22 are typically connected to sense electronics, not shown in FIG. 1. Sense electronics detect changes in capacitance as proof masses 12 move toward and/or away from their respective sense plates 22 and the respective motor drive combs 18 and motor pickoff combs 20.

Motor pickoff combs 20 are typically connected to a motor pickoff bias voltage (not shown), and motor drive combs 18 are typically connected to drive electronics, (not shown). The drive electronics cause the respective proof mass 12 to oscillate at substantially a tuning fork frequency along the drive axis (X-axis) by using the capacitors formed by the plurality of interdigitated comb-like electrodes 26, 28 of proof mass 12 and motor drive comb 18. Gyroscope 10 has two closely spaced modes of oscillation. One of the modes, sometimes referred to as a motor mode, is driven by an electrostatic force, at a resonant frequency of gyroscope 10 to produce a relatively large amplitude of oscillation. When a rotational force is applied to gyroscope 10, a Coriolis force is produced which is proportional to the velocity of proof mass 12 in the motor mode. The Coriolis force drives a second mode of oscillation of gyroscope 10, sometimes referred to as a sense mode. One or more electrodes are provided to detect oscillations in the sense mode, as described below, utilizing capacitance. A DC and/or an AC bias voltage is applied to sense electrodes, so that a motion of proof masses 12 in the sense mode produces an output current.

In one embodiment, proof masses 12 oscillate mechanically out-of-phase with one another. For example, as right proof mass 56 moves towards its respective motor drive comb 18 (i.e. to the right), left proof mass 54 moves towards its respective motor drive comb 18 (i.e. to the left). However, other oscillations of proof masses 56 and 54 can exist which are undesirable. In particular, proof masses 56 and 54 sometimes exhibit an in-phase oscillation, for example, when right proof mass 56 moves to the right, left proof mass 54 also moves to the right. Such an oscillation is sometimes referred to as common mode oscillation. Although this type of oscillation typically occurs at frequencies other than the operating frequency, the operational results are undesirable.

MEMS device 10 is further configured with a plurality of anchored support structures 52. As described above, proof masses 12 are further identified as a left proof mass 54 and a right proof mass 56. The terms "left" and "right" as used herein are for illustrative purposes with respect to the Figures only to describe operation of anchored support structures 52, and do not imply any type of structural limitations of MEMS device 10. Left proof mass 54 and right proof mass 56 are supported above the substrate, as described above, by suspensions 14. Support structures 52 include an anchor 62 connected to the substrate and a plurality of beams 64. Beams 64 include a first portion 66 and a second portion 68 each of which are substantially perpendicular to, and connected to, one of suspensions 14 of each proof mass 54 and 56. Both suspensions 14 and beams 64 are, in one embodiment, micro-machined from a silicon wafer. In one embodiment, anchor 62 is fabricated from a material that is rotationally compliant. Therefore, anchor 62 has a low torsional stiffness and allows for rotation about the sense axis (Z-axis). First portion 66 and second portion 68 are connected to one another through a third portion 70 which forms an approximate right angle with, and extends between, each of first portion 66 and second portion 68. In one embodiment, third portion 70 is connected, at an approximate midpoint 72, to a top of anchor 62 and is approximately parallel to respective suspensions 14. In a particular embodiment, one of first portion 66 and second portion 68 is attached to a suspension 14 relatively close to a respective one of anchor points 74 and farther away from proof masses 54 and 56. The other of first portion 66 and second portion 68 is then located closer to the respective proof mass 54, 56. Motions of proof masses 54 and 56 cause beams 64 to pivot about anchor 62. The structure comprised of the combination of anchors 62 and beams 64 is compliant during motor mode motion of proof masses 54 and 56, but is very stiff during common mode oscillation. Thus, frequency of common mode oscillation is substantially increased, so its frequency is much different than that of the motor mode frequency.

In a specific embodiment, support structures 52 are configured such that the torque applied to individual anchors 62 is equal and opposite in motor mode oscillation. Thus, the net torque applied to the substrate is zero. Such a configuration minimizes transmission of mechanical energy into the substrate, providing a maximum mechanical Q of the motor mode oscillation.

In another embodiment (not shown), first portion 66 is attached to right proof mass 56, and second portion 68 is attached to left proof mass 54. In such an embodiment, all four suspensions 14 attached to a proof mass apply equal mechanical forces to the proof mass, providing a high degree of mechanical symmetry.

Figure 2:
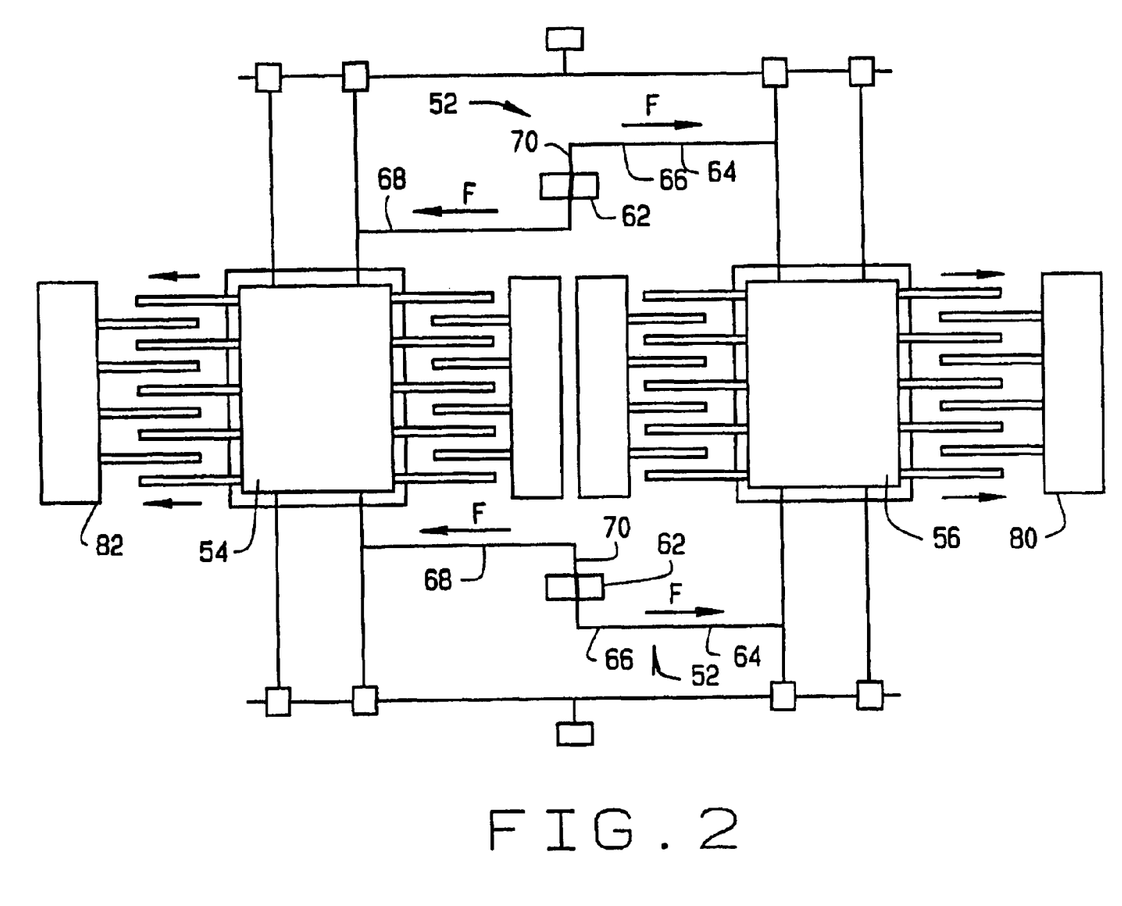
FIG. 2 is an illustration of the MEMS of FIG. 1 showing one effect of the anchored support structure in a motor mode.

FIG. 2 illustrates one effect of anchored support structure 52 on proof masses 54 and 56 in a first portion of a motor drive oscillation. When right proof mass 56 moves towards right drive comb 80, first portion 66 of each beam 64 is also pulled towards right drive comb 80. Third portion 70 of beam 64 applies a rotational moment, due to the anchoring of third portion 70 at anchor 62, which causes second portion 68 of beam 64 to apply a force towards left drive comb 82. Such force causes left proof mass 54 to move towards left drive comb 82, as desired in motor mode.

Figure 3:
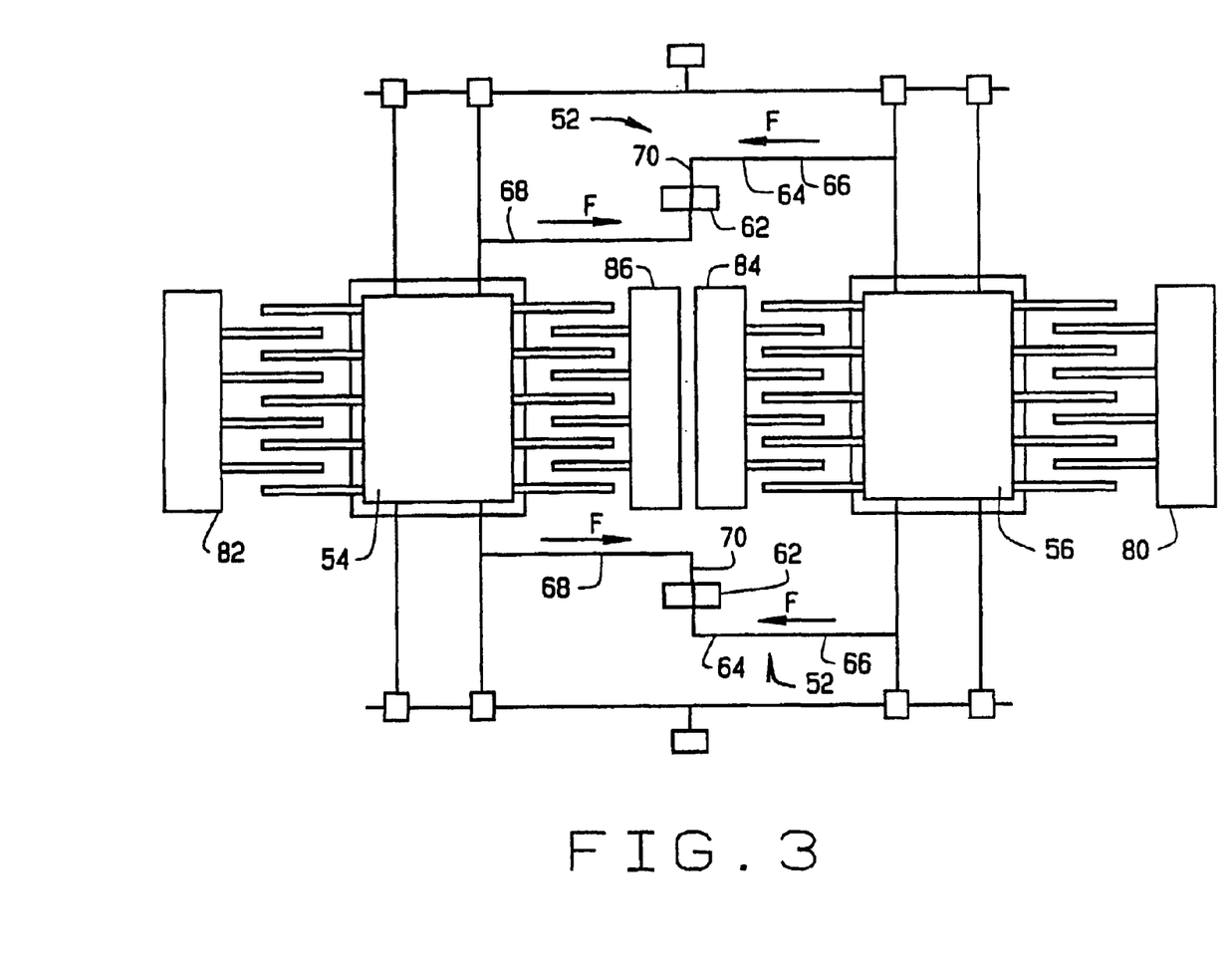
FIG. 3 is an illustration of the MEMS of FIG. 1 which further shows the effect of the anchored support structure in motor mode.

FIG. 3 illustrates the effect on proof masses 54 and 56 by anchored support structure 52 in a second portion of a motor drive oscillation. When right proof mass 56 moves towards right sense comb 84, first portions 66 of beams 64 are pushed in the same direction. Third portion 70 of beam 64 applies a rotational moment, due to the anchoring of third portion 70 at anchor 62, which causes second portion 68 of beam 64 to apply a force which causes left proof mass 54 to move towards left sense comb 86, as desired in motor mode.

Anchored support structures 52 reduce or eliminate common mode oscillations parallel to the plane of the substrate by proof masses 54, 56 as rotational moments exerted at anchor 62 by first portion 66 and second portion 68 of beam 64 which produce common mode oscillation cancel one another. The result is substantially zero rotation of third portion 70 of beam 64 resulting from common mode forces applied to proof masses 54, 56, and substantially no common mode oscillation of proof masses 54 and 56.

Figure 4:
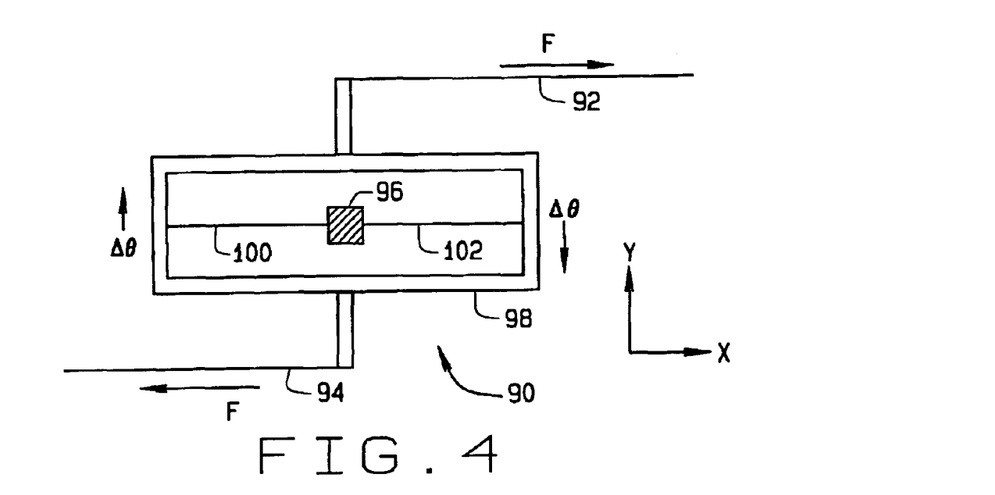
FIG. 4 is an illustration of compliant suspension beams pivotably anchored to an anchor.

FIG. 4 illustrates an embodiment of an anchored support structure 90 with suspension beams 92, 94 pivotably anchored to an anchor 96 through a rectangular suspension 98. Support structure 90 provides a structure that is compliant when externally applied forces to suspension beams 92, 94 are in opposite directions (as shown in the figure), but stiff when the externally applied forces are in the same direction. Suspension beams 92, 94 connect anchored support structure 90 to two parts of a MEMS device, for example, proof masses, in order to suppress common mode motion of the two parts of the MEMS device. Suspension beams 92, 94 are attached to a rectangular suspension 98, which is connected to anchor 96 through anchoring beams 100, 102. Anchor 96 is attached to the substrate, and does not rotate. Segments of rectangular suspension 98 are relatively stiff to bending forces, compared to suspension beams 92, 94, and anchoring beams 100, 102. A torque is applied to rectangular suspension 98 by oppositely directed external forces applied to suspension beams 92 and 94, as shown by vectors F. A compliance of anchoring beams 100 and 102 allows these beams to bend when said torque is applied, allowing rectangular suspension 98 to rotate through an angle Δθ in the direction as shown in FIG. 4. Rotation of rectangular suspension 98 allows suspension beams 92 and 94 to displace longitudinally (along the X-axis), allowing motor mode motion of the two parts of the MEMS device connected to suspension beams 92 and 94.

In common mode oscillation of the two parts of the MEMS device attached to suspension beams 92 and 94, the external forces F on suspension beams 92 and 94 are applied in the same direction along the X-axis. In such a case, the torque on rectangular suspension 98 is zero, and rectangular suspension 98 does not rotate. Thus, the common mode displacements of suspension beams 92 and 94 along the X-axis are small. It is understood that anchoring beams 100 and 102 can have a variety of shapes other than the straight suspensions shown in FIG. 4. Anchoring beams 100 and 102, in one embodiment, provide high bending compliance and high longitudinal (X-axis) stiffness. A variety of linkages between rectangular suspension 98 and suspension beams 92 and 94 are also contemplated. These linkages should be relatively stiff when common mode external forces are applied, but compliant when rectangular suspension 98 rotates in the presence of differential mode forces.

Figure 5:
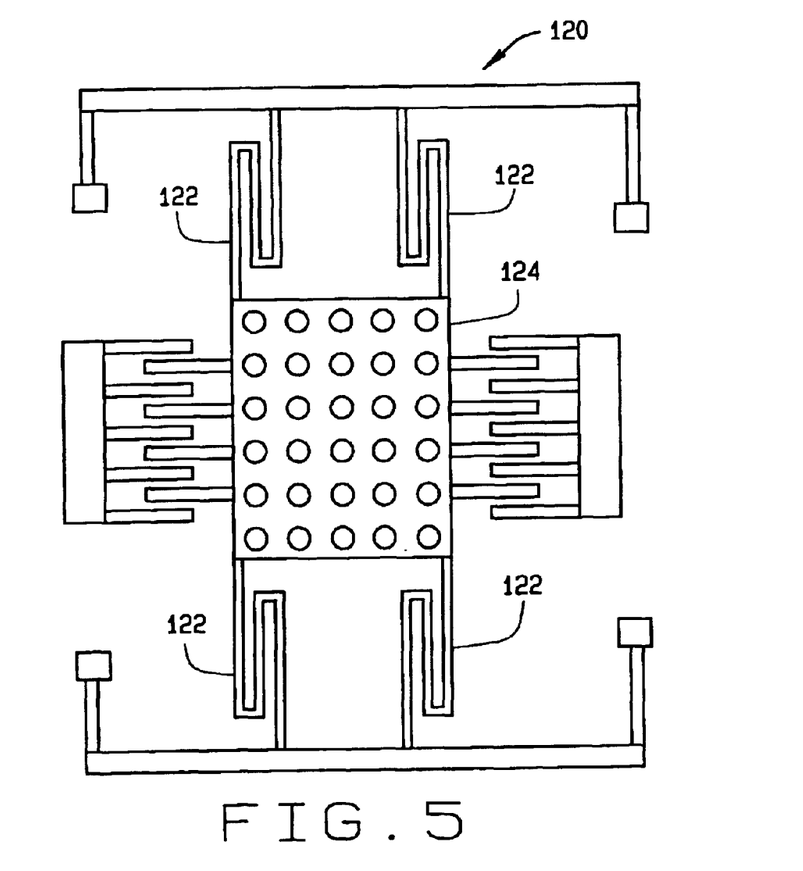
FIG. 5 is an illustration of a proof mass which is suspended with folded beam suspensions.

As referenced above, FIG. 5 illustrates a MEMS device 120 which incorporates folded beam suspensions 122 to suspend proof mass 124. The above described anchored support structures 52 (shown in FIGS. 1-3), including those which incorporate rectangular suspensions 98 (shown in FIG. 4) and anchoring beams 100, 102 (shown in FIG. 4) may be utilized in conjunction with folded beam suspensions 122 to reduce or adjust common mode oscillations in MEMS device 120 or any other MEMS device which incorporates folded beam suspensions 122, or any other type of suspension configuration.

The pivoting action of beams coupled to respective proof masses with respect to anchors provide a coupling motion to ensure correct mechanical phase between proof masses, as described with respect to the above embodiments. As common mode oscillations are passively changed, attenuated, or eliminated, vibration sensitivity of MEMS devices, for example, device 10, is reduced as compared to any active common mode oscillation suppression. Additionally, anchors 62 and beams 64 (both shown in FIG. 1) can be manufactured using the same process used to manufacture suspensions 14 (shown in FIG. 1) and other portions of device 10, so no additional process steps have to be added to the manufacturing process. In additional embodiments, other lengths, thickness, and widths of beams 64 are contemplated, which adjust a flexibility of beams 64, which results in adjusted forces applied to the proof masses. Such adjustable forces may be utilized to provide different operational characteristics, based upon proof mass movement within a MEMs device.

The above described embodiments are utilized to adjust operational characteristics of MEMS devices. While described with respect to MEMS gyroscopes, the descriptions should not be construed to be so limiting. While FIG. 1 shows MEMS gyroscope 10 as a tuning fork gyroscope, other MEMS vibratory gyroscopes that use Coriolis acceleration to detect rotation may benefit from the use of anchors 62 and beams 64. In addition, anchored support structures similar to anchored support structure 52 can be incorporated into other MEMS devices, including, but not limited to, accelerometers, inertial measurement units, pressure sensors, and temperature sensors. Anchored support structures 52 which attach to suspensions of respective proof masses can also be utilized to adjust performance parameters of MEMS devices.

While the invention has been described in terms of various specific embodiments, those skilled in the art will recognize that the invention can be practiced with modification within the spirit and scope of the claims.

What is claimed is:

1. A method for reducing undesired movements parallel to a plane of a substrate of proof masses in micro-electromechanical systems (MEMS) devices, the proof masses being suspended above the substrate by one or more suspensions, said method comprising:
   providing a rotationally compliant anchor on the substrate substantially between a first proof mass and suspensions for the first proof mass and a second proof mass and suspensions for the second proof mass;
   coupling a first portion of a beam to the first proof mass;
   coupling a second portion of the beam to the second proof mass; and
   attaching a third portion of the beam directly to the anchor, the third portion extending between the first portion and second portion of the beam and extending across a top of the anchor the anchor and the third portion configured to allow at least a partial rotation of the third portion of the beam about an axis perpendicular to the substrate.

2. A method according to claim 1 further comprising forming the third portion of the beam at an approximate right angle to both the first portion and the second portion of the beam.

3. A method according to claim 1 wherein:
   coupling a first portion of a beam comprises attaching the first portion of the beam to a suspension for the first proof mass; and
   coupling a second portion of the beam comprises attaching the second portion of the beam to a respective suspension for the second proof mass.

4. A method according to claim 3 wherein:
   attaching the first portion of the beam comprises attaching the first portion of the beam substantially perpendicular to the suspension; and attaching the second portion of the beam comprises attaching the second portion of the beam substantially perpendicular to the respective suspension.

5. A method according to claim 1 wherein attaching a third portion of the beam directly to the anchor comprises attaching an approximate midpoint of the third portion to the anchor.

6. A method according to claim 1 wherein:
   coupling a first portion of a beam comprises attaching the first portion of the beam to the first proof mass; and
   coupling a second portion of the beam comprises attaching the second portion of the beam to the second proof mass.

7. A method for reducing undesired movements parallel to a plane of a substrate of proof masses in micro-electromechanical systems (MEMS) devices, the proof masses being suspended above the substrate by one or more suspensions, said method comprising:
   providing an anchor on the substrate substantially between a first proof mass and suspensions for the first proof mass and a second proof mass and suspensions for the second proof mass;
   coupling a first portion of a beam to the first proof mass;
   coupling a second portion of the beam to the second proof mass;
   attaching the first portion and the second portion of the beam to a rectangular suspension;
   attaching anchoring beams to the rectangular suspension; and
   attaching the anchoring beams to an anchor, the anchoring beams, and the rectangular suspension configured to at least a partially rotate about an axis perpendicular to the substrate.

8. A micro-electromechanical systems device comprising:
   a substrate;
   at least two proof masses;
   at least two suspensions extending from each said proof mass;
   at least one anchor comprising a top, said anchor contacting said substrate; and
   at least one beam comprising a first portion, a second portion, and a third portion, said first portion coupled to a first said proof mass, said second portion coupled to a second said proof mass, said third portion connected to said first portion and said second portion, said third portion extending between said first and said second portions, said third portion directly attached to and extending across said top of said anchor, said anchor and said third portion configured to allow at least a partial rotation of said third portion of said beam about an axis perpendicular to said substrate.

9. A device according to claim 8 wherein said third portion of each said beam is substantially perpendicular to both said first portion and said second portion of each said beam.

10. A device according to claim 8 wherein to couple said first portion of said beam to a first said proof mass and said second portion of said beam to a second said proof mass, said first portion of said beam is attached to a suspension for said first proof mass and said second portion of said beam is attached to a suspension for said second proof mass.

11. A device according to claim 10 wherein said first portion of said beam is connected to said suspension at a point between a midpoint of said suspension and an anchor point for said suspension.

12. A device according to claim 10 wherein said first portion and said second portion of each said beam extends substantially perpendicular to said suspensions.

13. A device according to claim 8 wherein to couple said first portion of said beam to a first said proof mass and said second portion of said beam to a second said proof mass, said first portion of said beam is attached to said first proof mass and said second portion of said beam is attached to said second proof mass.

14. A device according to claim 8 wherein each said anchor is connected to a substantial midpoint of said third portion of each said beam.

15. A device according to claim 8 wherein each said anchor is formed as a portion of said substrate.

16. A device according to claim 8 wherein each said beam is micro-machined from a silicon wafer.

17. A device according to claim 8 wherein said device comprises at least one of a gyroscope, an inertial measurement unit, and an accelerometer.

18. A device according to claim 8 wherein said suspensions comprise folded beam suspensions.

19. A micro-electromechanical systems device comprising:
   a substrate;
   at least two proof masses;
   at least two suspensions extending from each said proof mass;
   at least one anchor contacting said substrate;
   at least one beam comprising a first portion and a second portion, said first portion coupled to a first said proof mass, said second portion coupled to a second said proof mass;
   a rectangular suspension attached to said first portion and said second portion of said beam; and
   at least one anchoring beam attached to said rectangular suspension and configured to be attached to said anchor, said anchoring beam, and said rectangular suspension configured to at least a partially rotate about an axis perpendicular to said substrate.

20. An anchored support structure for a micro-electromechanical systems device, said structure comprising:
   a rotationally compliant anchor comprising a top, said anchor connected to a substrate; and
   a beam comprising a first portion, a second portion, and a third portion, said first portion configured to be coupled to a first proof mass, said second portion configured to be coupled to a second proof mass, said third portion extending between said first portion and said second portion, said third portion directly attached to and extending across said top of said anchor, said anchor and said third portion configured to allow at least a partial rotation of said third portion of said beam about an axis perpendicular to the substrate.

21. An anchored support structure according to claim 20 wherein to couple said first portion of said beam to the first proof mass and said second portion of said beam to the second proof mass, said first portion of said beam is attached to a suspension for the first proof mass and said second portion of said beam is attached to a suspension for the second proof mass.

22. An anchored support structure according to claim 21 wherein said first portion is substantially perpendicular to the suspension to which it is attached and said second portion is substantially perpendicular to the suspension to which it is attached.

23. An anchored support structure according claim 20 wherein to couple said first portion of said beam to the first proof mass and said second portion of said beam to the second proof mass, said first portion of said beam is attached the first proof mass and said second portion of said beam is attached to the second proof mass.

24. An anchored support structure according to claim 20 wherein said beam is configured such that when said third portion pivots about said anchor, said first portion moves in a first direction, and said second portion moves in a direction opposite to the first direction.

25. An anchored support structure according to claim 20 wherein said third portion is attached to said anchor at an approximate midpoint of said third portion.

26. An anchored support structure for a micro-electromechanical systems device, said structure comprising:
   an anchor connected to a substrate;
   a beam comprising a first portion and a second portion, said first portion configured to be coupled to a first proof mass, said second portion configured to be coupled to a second proof mass;
   a rectangular suspension attached to said first portion and said second portion of said beam; and
   at least one anchoring beam attached to said rectangular suspension and configured to be attached to said anchor, said anchoring beam and said rectangular suspension configured to at least partially rotate about an axis perpendicular to the substrate.

27. A micro-electromechanical systems gyroscope comprising:
   a substrate;
   two proof masses;
   a plurality of suspensions, a first plurality configured to suspend the first said proof mass above said substrate, and a second plurality configured to suspend the second said proof mass above said substrate; and
   an anchored support structure comprising an anchor comprising a top, said anchor formed on said substrate and a beam, said beam comprising a first portion coupled to said first proof mass, a second portion coupled to said second proof mass, and a third portion directly attached to and extending across said top of said anchor, said anchor and said third portion configured to allow at least a partial rotation of said third portion of said beam about an axis perpendicular to said substrate, said third portion extending between said first portion and said second portion.

28. A micro-electromechanical systems gyroscope according to claim 27 wherein said third portion is substantially perpendicular to said first portion and said second portion.

29. A gyroscope according to claim 27 wherein said first portion is attached substantially perpendicular to said suspension for said first proof mass and said second portion is attached substantially perpendicular to said suspension for said second proof mass.

30. A gyroscope according to claim 27 wherein said beam is configured such that when said third portion pivots about said anchor, said first portion moves in a first direction, and said second portion moves in a direction opposite to the first direction.

31. A micro-electromechanical systems gyroscope according to claim 27 wherein said suspensions comprise folded beam suspensions.

32. A micro-electromechanical systems gyroscope comprising:

a substrate;

two proof masses;

a plurality of suspensions, a first plurality configured to suspend the first said proof mass above said substrate, and a second plurality configured to suspend the second said proof mass above said substrate; and an anchored support structure comprising an anchor formed on said substrate and a beam, said beam comprising a first portion coupled to the first said proof mass and a second portion coupled to the second said proof mass, a rectangular suspension attached to said first portion and said second portion of said beam and at least one anchoring beam attached to said rectangular suspension and configured to be attached to said anchor, said anchoring beam and said rectangular suspension configured to at least partially rotate about an axis perpendicular to said substrate.

33. A method for correlating movement between respective proof masses in micro-electromechanical systems devices, the proof masses being suspended above a substrate by one or more suspensions, the suspensions extending from the proof masses at a first end and anchored to the substrate at a second end, said method comprising:

mechanically connecting at least one suspension for the first proof mass and at least one suspension for the second proof mass, the mechanical connection to at least one suspension at a location between a midpoint of the suspension and an anchor point for the suspension; and providing a rotational moment within the mechanical connection, the rotational moment being along an axis perpendicular to the substrate.

34. A method according to claim 33 wherein providing a rotational moment comprises pivotably anchoring a portion of the mechanical connection to the substrate.

35. A method according to claim 33 further comprising configuring the mechanical connection such that a movement in the suspension for one proof mass in a first direction substantially prevents a movement in the same direction in the suspension for the other proof mass.

* * * * *